(12) United States Patent
Ruiz Cuenca

(10) Patent No.: US 10,347,161 B2
(45) Date of Patent: Jul. 9, 2019

(54) ROAD SIGN PLATE

(71) Applicant: INTERLIGHT SP, S. L.

(72) Inventor: José Carlos Ruiz Cuenca, Cordova (ES)

(73) Assignee: INTERLIGHT SP, S. L., Málaga (ES)

(*) Notice: Subject to any disclaimer, the term of this patent is extended or adjusted under 35 U.S.C. 154(b) by 0 days.

(21) Appl. No.: 15/500,902

(22) PCT Filed: Jul. 31, 2014

(86) PCT No.: PCT/ES2014/070625
§ 371 (c)(1),
(2) Date: Jan. 31, 2017

(87) PCT Pub. No.: WO2016/016484
PCT Pub. Date: Feb. 4, 2016

(65) Prior Publication Data
US 2017/0229048 A1    Aug. 10, 2017

(51) Int. Cl.
| G09F 13/04 | (2006.01) |
| G09F 13/22 | (2006.01) |
| E01F 9/559 | (2016.01) |
| E01F 9/582 | (2016.01) |
| B32B 3/08 | (2006.01) |
| B32B 3/30 | (2006.01) |
| B32B 15/08 | (2006.01) |

(Continued)

(52) U.S. Cl.
CPC .............. *G09F 13/22* (2013.01); *B32B 3/085* (2013.01); *B32B 3/30* (2013.01); *B32B 15/08* (2013.01); *B32B 27/08* (2013.01); *B32B 27/36* (2013.01); *E01C 17/00* (2013.01); *E01F 9/559* (2016.02); *E01F 9/582* (2016.02); *F21V 15/01* (2013.01); *F21V 23/06* (2013.01); *G09F 19/228* (2013.01); *B32B 2250/03* (2013.01); *B32B 2307/402* (2013.01); *B32B 2307/414* (2013.01); *B32B 2457/20* (2013.01); *F21Y 2103/10* (2016.08); *F21Y 2115/10* (2016.08); *G09F 2013/222* (2013.01)

(58) Field of Classification Search
CPC ........... B32B 3/085; B32B 3/30; B32B 15/08; B32B 27/08; B32B 27/36; B32B 27/365; E01C 17/00; E01F 9/582; F21V 15/01; F21V 23/06; G09F 13/22; G09F 19/228
USPC .............. 362/249.02, 311.02, 330, 612, 812; 40/541–583
See application file for complete search history.

(56) References Cited

U.S. PATENT DOCUMENTS

| 6,354,714 B1 * | 3/2002 | Rhodes | B64F 1/20 362/145 |
| 6,404,131 B1 * | 6/2002 | Kawano | G09F 9/33 257/E33.072 |
| 2009/0032825 A1 * | 2/2009 | Mo | G09F 13/22 257/88 |

FOREIGN PATENT DOCUMENTS

| ES | 1076871 U | 5/2012 |
| KR | 20040075651 A | 8/2004 |
| KR | 20100117741 A | 11/2010 |

* cited by examiner

*Primary Examiner* — Jason M Han
(74) *Attorney, Agent, or Firm* — MU P.C.

(57) ABSTRACT

Disclosed is a road sign plate comprising: a base plate (2); a series of LEDs (4) disposed on said base plate; and power-supply means connected to said series of LEDs. In particular, the road sign plate comprises: a first resin layer (1) that covers at least the base plate (2); and a second resin layer (7) disposed on said first resin layer, said second resin layer (7) being of a translucent material. The road sign plate (Continued)

is a low cost plate, with high electro-mechanical strength and improved translucency properties.

10 Claims, 4 Drawing Sheets

(51) Int. Cl.
    *B32B 27/08*     (2006.01)
    *B32B 27/36*     (2006.01)
    *E01C 17/00*     (2006.01)
    *F21V 15/01*     (2006.01)
    *F21V 23/06*     (2006.01)
    *G09F 19/22*     (2006.01)
    *F21Y 103/10*     (2016.01)
    *F21Y 115/10*     (2016.01)

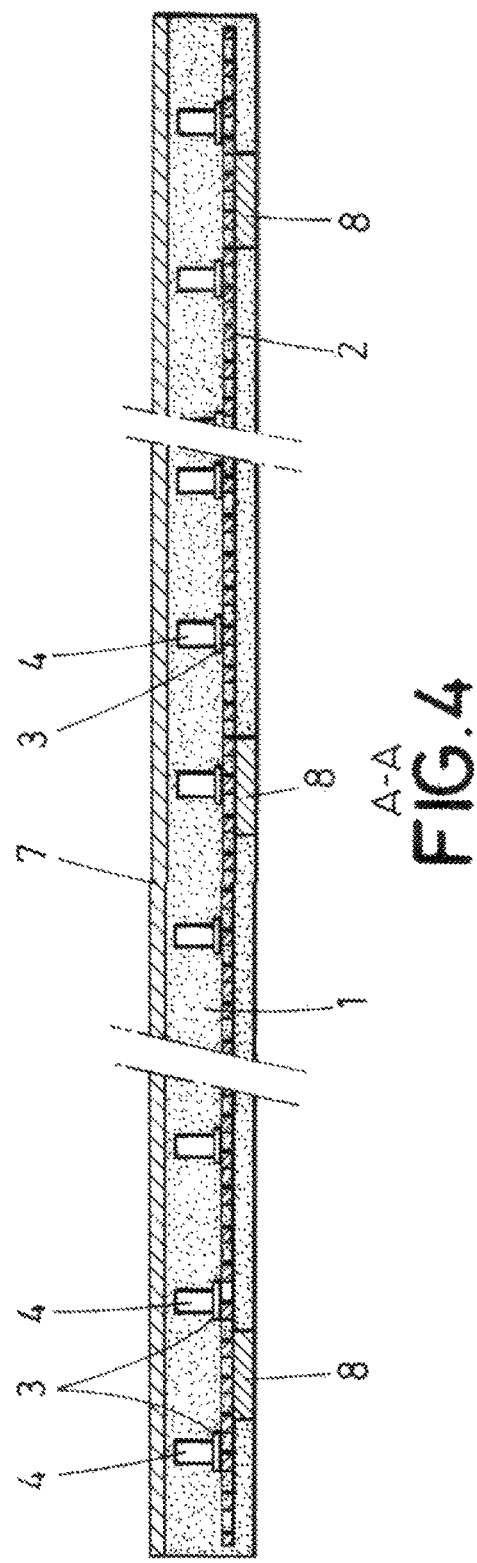

ROAD SIGN PLATE

OBJECT OF THE INVENTION

The present invention discloses a road sign plate, particularly it discloses a plate comprising signing lighting means which are especially advantageous in the case of road signs.

BACKGROUND OF THE INVENTION

There are known different forms of road signs from the prior art which are joined or arranged on the ground in order to provide the driver with information regarding road signs.

Particularly, the use of paint on the ground is well known. These horizontal road markings, made by means of a layer of white paint applied on the ground, are not provided with lighting means, but they are made up, as already mentioned, by a layer of white paint which will get dirty, fade away and be less visible over time, especially under conditions of low luminosity, cloudy or foggy days or simply during night time.

Likewise, signing luminous devices are known, such as that described by ES1076871U which comprises prismatic slabs fitted in a resin and comprising a metallic base. In this case, the LEDs used must be provided with some kind of additional protection to prevent the vehicles passing over the devices from causing damages thereto, and these require additional maintenance since solar rays (particularly UVA rays) may damage said LEDs protection and they can turn opaque, reducing the light passing through said resin. Furthermore, this protection for LEDs incorporates a rough finish or a series of engravings in the outer area so as to improve the user adherence to the device, so that slips or vehicle skids may be avoided.

Document KR20100117741A disclose a road sign plate according to the preamble of claim 1.

DESCRIPTION OF THE INVENTION

The present invention discloses a road sign plate which solves the problems of the devices from the prior art as it is provided with a different physical configuration which entails improvements regarding the user adherence to the plate, as well as improvements regarding the durability of the device, and it reduces the maintenance requirements thereof.

In particular, the present invention discloses a road sign plate comprising a base plate, a series of LEDs arranged on said base plate and power supply means associated to said series of LEDs, said plate being provided with a first resin layer which covers, at least, the base plate and a second resin layer arranged over said first resin layer, being said second resin layer of a translucent material.

Preferably, both the base plate and the LEDs are embedded in said first resin layers. Thus, two effects are achieved: on the one side there is an improved mechanical protection because, since the internal elements are embedded, there are no gaps which allow the movement thereof avoiding possible mechanical impacts, and, on the other hand, they prevent the introduction of humidity which may oxidize or create a short-circuit in the internal elements (LED, base plate, power supply means, etc.).

In a preferred embodiment, the power supply means comprise a supply strip arranged in at least one of the sides of the base plate.

Furthermore, the first resin layer is optionally made of a translucent material, so that it is possible that the light emitted by the LEDs gets through, at least, in a direction perpendicular to said LEDs.

Preferably, the base plate is a metallic plate and, additionally, it may comprise a series of transversal projections in its lower area, in such a way that, when arranging the resin over said plate it becomes completely covered by the resin.

In an especially advantageous embodiment, the second resin layer is white coloured. This avoids the need of using paints which can cause the users to slip when passing over them. Additionally, an engraving can be arranged or pores can be created on the upper surface, using means known in the art, so as to improve the user adherence to the road sign plate object of the present invention.

Additionally, the plate according to the present invention may be connected in a modular way to other plates, which is why each one of the plates may comprise means to connect to other road sign plates. Said means to connect to other plates may comprise, for example, electrical connecting means for connecting the power supply means to each other.

On the other hand, the present invention envisages the possibility that the plate comprises means to communicate with other external devices such as, for example, mobile devices, traffic lights, video cameras, infrared cameras and/or occupancy sensors. This communication can be preferably done by means of communication protocols which are known in the art, such as Bluetooth, Wi-Fi and/or NFC.

Regarding manufacturing materials, the second resin layer may be made of a material comprising polyester and, preferably, may also be of a material comprising unsaturated polyester.

DESCRIPTION OF THE DRAWINGS

To implement the present description and in order to provide a better understanding of the characteristics of the invention, according to a preferred practical embodiment thereof, a set of drawings is attached as part of this description, with an illustrative but not limitative purpose, which represents the following:

FIG. 4 shows the A-A cut of the road sign plate of FIG. 3.

PREFERRED EMBODIMENT OF THE INVENTION

Figure 1:
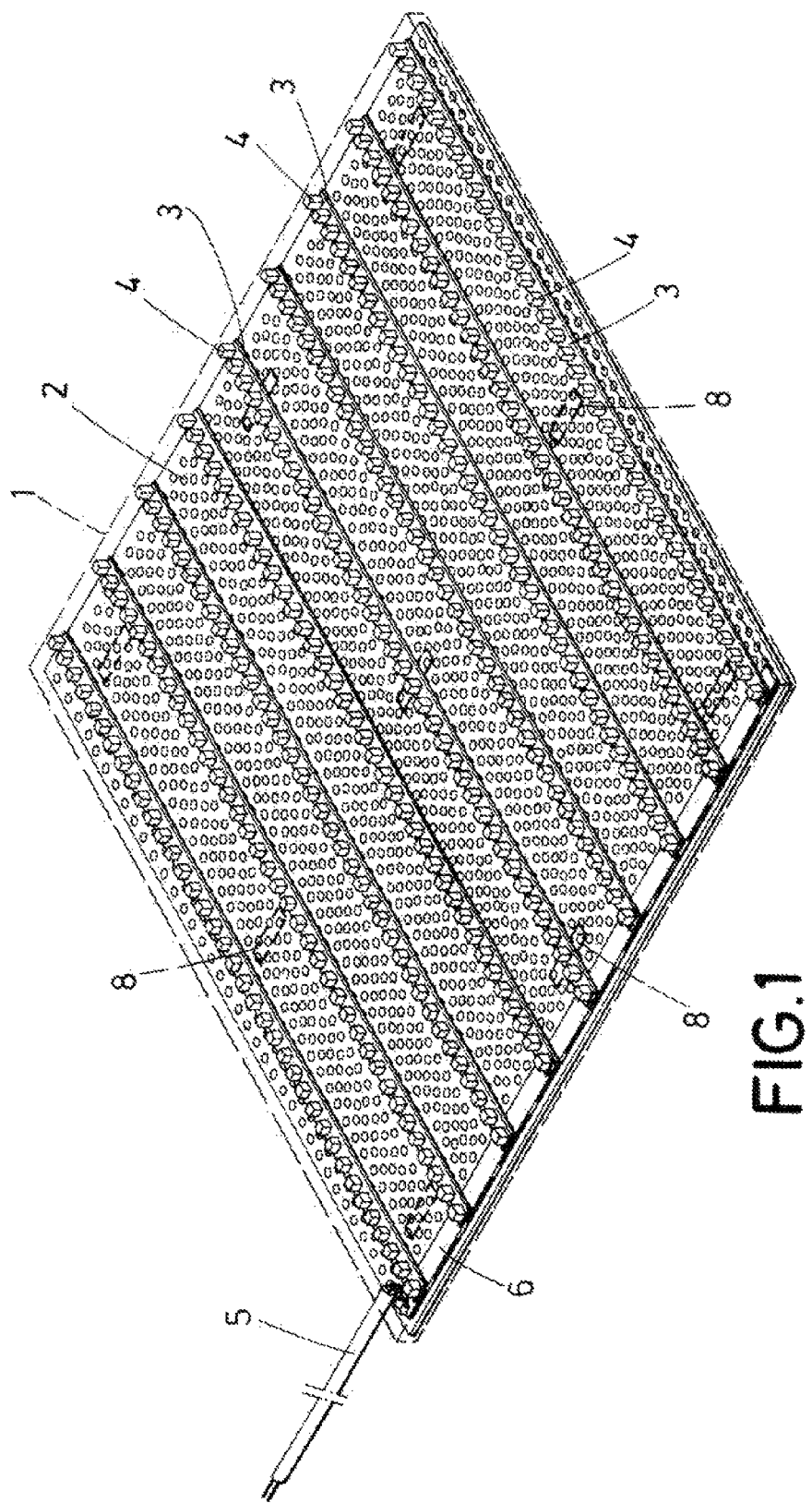
FIG. 1 shows a plan view of the internal components of a road sign plate according to the present invention.

FIG. 1 is a view showing the internal elements of the road sign plate object of the present invention.

This figure shows by means of a dashed line the presence of a resin layer (1), and embedded in said first resin layer (1) there is a base plate (2) on which there is arranged a series of strips (3) comprising a series of LEDs (4) arranged on said base plate (2). Said strip (3) comprises, at least, a conductive material track interconnecting said LEDs (4) to a power supply (not shown) by means of electrical connection means (5), which preferably comprise a cable.

Furthermore, the plate comprises a bus arranged at one of the sides of said plate, for the power supply of each of the strips (3), being this bus referred to hereinafter as supply strip (6).

On the other hand, the present invention envisages that the base plate (2) is provided with transversal projections (8) in its lower area. These projections are used to provide height to the base plate (2) so that, when the first resin layer (1) is laid in liquid state over said plate, it spreads all over the lower surface of said plate, thus preventing air bubbles from being formed. In especially preferred embodiments, this first resin layer (1) may incorporate chemical elements which enhance the electric resistance, so that they can be used for protecting the electrical connections. Additionally, this first resin layer (1) does not have to be necessarily of a translucent material, since it works simply as mechanical and electrical protection of the internal components of the road sign plate. This difference represents a better performance of the plate at a lower cost, since commercial resins which meet the translucency, mechanical strength and electric resistance requirements involve a very high cost and require too much processing.

Figure 2:
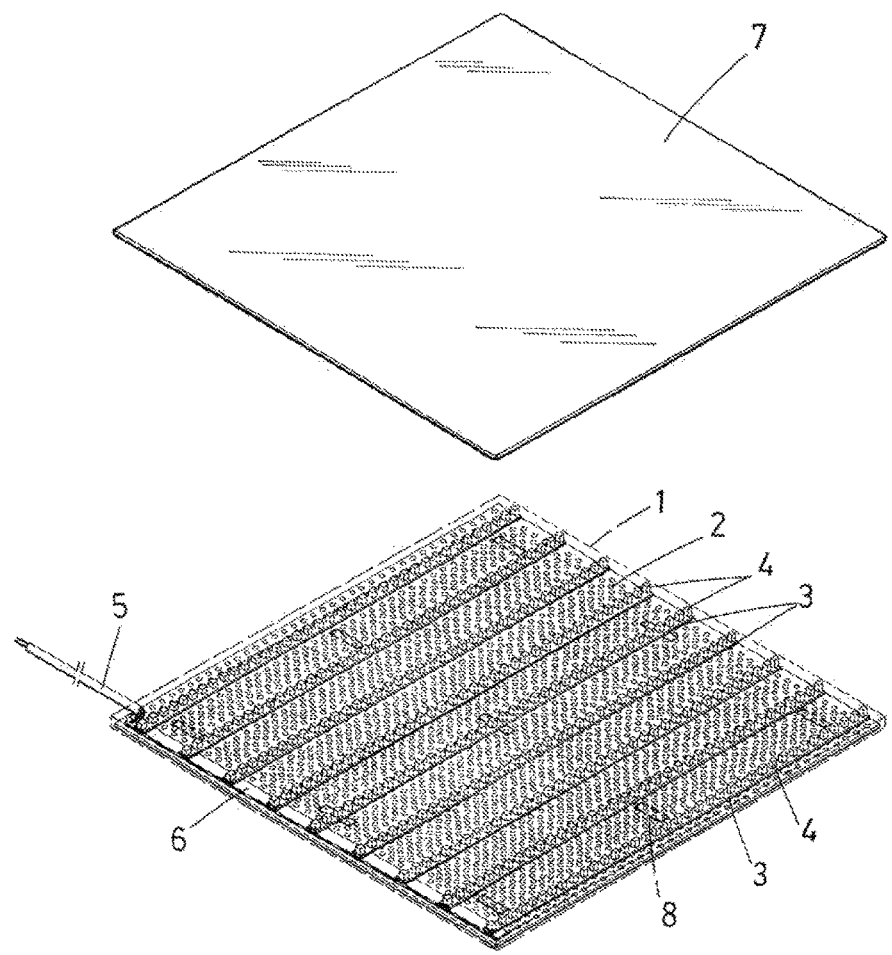
FIG. 2 shows a mechanical splitting up of the road sign plate of FIG. 1 including a second resin layer.

FIG. 2 also shows that there is a second resin layer (7) arranged over said first resin layer (1). This second resin layer (7) is a translucent resin and UVA-protected layer, but it requires a lower mechanical strength than the first resin layer (1) and it is not necessary that it has the property of being electrically insulating, which reduces its cost and makes it possible to be provided with better translucency and UVA protection properties, so as to feature less maintenance requirements.

Additionally, it is easier to provide elements which improve the user adherence to the surface, such as engravings, over this second resin layer (7), since it does not feature so high mechanical strength. This second resin layer (7) is, preferably, white-coloured in order to be adapted to the current regulation on signs arranged on the ground. However, other embodiments with several colours, according to the needs of the user and/or the regulation of the corresponding territory, would also be included under the protection scope of the present invention.

Figure 3:
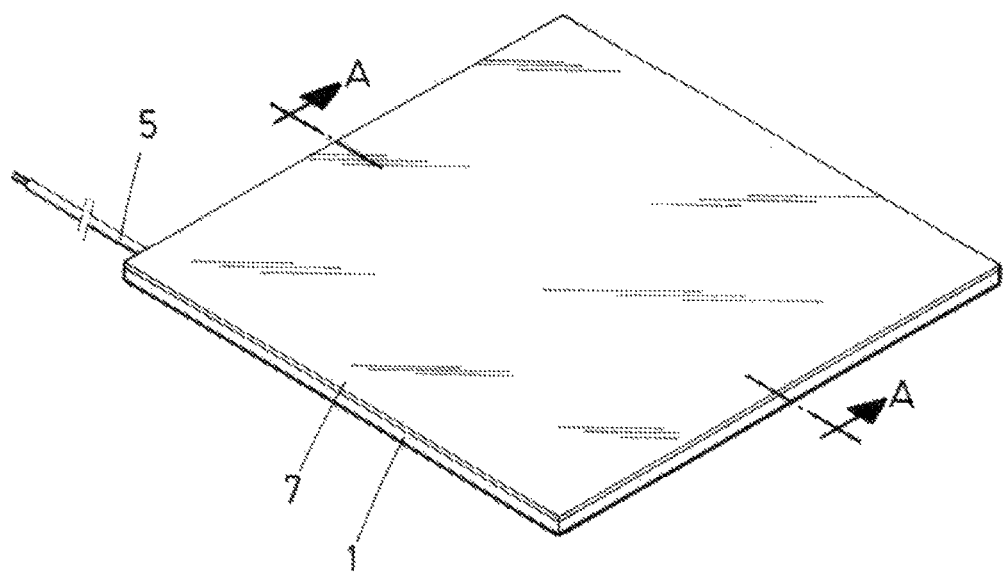
FIG. 3 shows a perspective view of a road sign plate according to the present invention.

FIGS. 3 and 4 show an exemplary embodiment of the present invention, wherein FIG. 4 shows the cross section A-A of FIG. 3.

In these FIGS. 3 and 4 it can be seen that the first resin layer (1) covers all the electrical elements of the road sign plate, such as the strips (3) of LEDs (4), the supply strips (6), whereas the second resin layer (7) only covers the LEDs (4) partially so that it does not need to meet the electromechanical properties of the first resin layer (1), but it plays a more esthetical role as it features a better UVA rays resistance and it allows the light emitted by the LEDs (4) to be visible from the exterior of said road sign plate.

Regarding the manufacturing materials, it has been envisaged that, in an especially preferred manner, the second resin layer (7) is of unsaturated polyester.

On the other hand, the road sign plate of the present invention has the capability of being provided with extensions by modularity.

In order to meet this modularity requirement, the plate comprises means to be joined to other similar road sign plates, and connection means among plates, wherein said connection means may be electrical connection means (5) wherein one of the end plates connect said electrical connection means (5) to a power supply.

On the other hand, the road sign plate object of the present invention may be provided with means for communications with external devices such as, for example, with traffic lights so that the LEDs (4) turn on only when the pedestrians are allowed to pass through said plate. Another option is communicating the road sign plate with external sensors such as, for example, luminosity and/or fog sensors so that the LEDs (4) turn on only under low visibility conditions.

Furthermore, the present invention envisages communications with mobile devices such as mobile phones or sticks featuring data processing and communications capability, in order to warn said devices about pedestrians being near and them being allowed or not allowed to pass by at a certain moment.

Although the present invention has been described with reference to an embodiment for pedestrian crossings signing, this invention is equally applicable, for example, for cycle lanes signing, among others.

The invention claimed is:

1. Road sign plate comprising a base plate (2), a series of LEDs (4) arranged on said base plate (2) and a power supply strip associated to said series of LEDs (4), a first resin layer (1) which covers, at least, the base plate (2) and a second resin layer (7) arranged over said first resin layer (1), said second resin layer (7) being of a translucent material characterized in that both the base plate (2) and the series of LEDs (4) are embedded in said first (1) resin layer and that the base plate (2) comprises, in its lower area, a series of transversal projections (8), wherein the second resin layer (7) is white in colour and comprised of translucent and long ultraviolet (UVA) resistant unsaturated polyester resin having a rough finish, and wherein the first resin layer (1) incorporates chemical elements which enhance electrical resistance.

2. Road sign plate according to claim 1, wherein the power supply strip (6) is arranged on at least one of the sides of the base plate (2).

3. Road sign plate, according to claim 1, characterized in that the first resin layer (1) is made of a translucent material.

4. Road sign plate, according to claim 1, characterized in that the base plate (2) is a metallic plate.

5. Road sign plate, according to claim 1, characterized in that it comprises means for connecting to other road sign plates.

6. Road sign plate, according to claim 5, characterized in that said means for connecting to other plates comprise electrical connection means (5) for connecting plates power supply means to each other.

7. Road sign plate, according to claim 1, characterized in that it comprises means for communicating with external devices.

8. Road sign plate, according to claim 7, characterized in that said external devices are devices selected from: mobile devices, traffic lights, cameras and/or presence sensors.

9. Road sign plate, according to claim 7, characterized in that said means for communicating with external devices consist of Bluetooth, Wi-Fi, NFC, or a combination thereof.

10. The road sign plate, according to claim 1, wherein the rough finish of the second resin layer is formed by a series of engravings.

* * * * *